United States Patent [19]

Thompson

[11] 3,980,558

[45] Sept. 14, 1976

[54] METHOD OF DISPOSING SLUDGES CONTAINING SOLUBLE TOXIC MATERIALS

[75] Inventor: Steve R. Thompson, Houston, Tex.

[73] Assignee: Browning-Ferris Industries, Inc.

[22] Filed: July 7, 1975

[21] Appl. No.: 593,542

[52] U.S. Cl. .................................. 210/59; 61/35
[51] Int. Cl.$^2$ .................................... C02C 5/02
[58] Field of Search ............. 61/35; 210/170, 59, 210/42 R, 55, 66

[56] References Cited
UNITED STATES PATENTS

| | | | |
|---|---|---|---|
| 3,586,624 | 6/1971 | Larson | 61/35 |
| 3,707,523 | 12/1972 | Ledden et al. | 61/35 |
| 3,841,102 | 10/1974 | Cinner et al. | 210/170 |

*Primary Examiner*—Thomas G. Wyse
*Attorney, Agent, or Firm*—Pravel & Wilson

[57] ABSTRACT

A novel method for permanently disposing of liquid or semi-liquid wastes containing soluble toxic materials to prevent the toxic materials from being leached into the surrounding environment is disclosed. The process comprises admixing the liquid or semi-liquid waste, such as aqueous sludge from the manufacture of phosphoric acid containing soluble and insoluble arsenic, sulfur and like toxic compounds, with a solidifying agent consisting essentially of a hydraulic cement in amounts sufficient to provide a fluid mass that will set to a contiguous rock-like solid upon standing, and then allowing the admixture to set to a contiguous rock-like solid mass which is insoluble in water. By the inventive process, the soluble and insoluble toxic materials of the waste are wholly entrapped in the contiguous rock-like solid mass which thereby prevents them from being leached into the surrounding environment when exposed to ambient moisture.

7 Claims, No Drawings

METHOD OF DISPOSING SLUDGES CONTAINING SOLUBLE TOXIC MATERIALS

BACKGROUND OF THE INVENTION

The present invention relates to the field of liquid or semi-liquid waste disposal and more particularly pertains to a novel process for disposing of liquid or semi-liquid wastes containing soluble and insoluble toxic materials capable of being leached into the surrounding environment when the wastes are exposed to ambient moisture thereby resulting in environmental pollution of the surrounding environment.

For many years, the majority of liquid and semi-liquid wastes containing soluble and insoluble toxic materials, such as industrial chemical process wastes, particularly aqueous sludges from the manufacture of phosphoric acids containing soluble and insoluble arsenic compounds, sulfur compounds, etc., were disposed of by concentrating the wastes in settling pools to a practicable solids level and then merely dumping or burying the concentrated materials at suitable landfill locations. However, due to present Federal and State regulations, these techniques have generally been discontinued for the exposure of such disposed wastes causes many of the toxic materials to leach out into nearby streams and underground water systems thereby creating environmental pollution.

There are several processes known for solidifying many types of liquid and semi-liquid waste materials to enable them to be disposed of as solids or substantially solid materials in or under suitable landfill sites. Generally speaking, such procedures include mixing the liquid or semi-liquid waste materials with inorganic mineral binding agents which react with the liquid of the wastes and set up to form substantially insoluble solid materials. Such procedures have been known and employed for many years; for example, U.S. Pat. No. 151,905 discloses a process for the manufacture of fertilizer which includes admixing night-soil with hydraulic cement or calcined plaster and pulverizing the resulting set solid. A more recent patent, U.S. Pat. No. 3,383,228, discloses a process for disposing of garbage and sewage in the form of solid blocks which includes a destructive distillation of the wastes, mixing the residual mass with a suitable binding agent such as sodium silicate and compacting the resulting admixture into blocks. U.S. Pat. No. 2,809,118 teaches admixing sewage sludges with water glass (sodium silicate), a hydratizing chemical such as sodium carbonate, ammonium carbonate, sodium bicarbonate, ammonium phosphate, and the like, and a clay material to form substantially solid plastic materials suitable for compacting into constructional materials.

Further, U.S. Pat. No. 3,837,872 describes a process for treating liquid and semi-liquid wastes to render them non-polluting which includes admixing with the liquid wastes an alkali metal silicate such as sodium silicate and a silicate setting agent such as Portland cement, lime, gypsum, etc., and calcium chloride which results in the formation of solid materials having physical characteristics ranging from dirt-like to substantially rock-like solids.

However, known prior art processes for solidifying liquid and semi-liquid wastes employing conventional mineral binding agents mentioned hereinbefore in accordance with known conventional techniques have been found to leave much to be desired when employed in the disposal of many types of liquid and semi-liquid wastes containing soluble and insoluble toxic materials, such as aqueous sludges from the manufacture of phosphoric acids which contain soluble and insoluble arsenic compounds, sulfur compounds, etc. The employment of such conventional mineral binding agents, only a few of which have been mentioned hereinabove, in accordance with known conventional techniques, results in the formation of solids which are highly porous, many of which being highly particulated. Moreover, it has been found that processes employing alkali silicates, e.g. sodium silicate, as a binding agent alone or in combination with other binding agents result in solids having low compressive strength which are readily particulated thereby providing additional surface area exposure to the environment. The resulting solids render conventional waste solidifying procedures unsatisfactory in the disposal of many types of liquid and semi-liquid wastes containing soluble and/or insoluble toxic materials for these materials are readily leached out of the solidified wastes when they are exposed to moisture into the surrounding environment thereby causing environmental pollution. For example, the process described in U.S. Pat. No. 3,837,872 which describes the use of an alkali silicate and a silicate setting agent has been found to leave much to be desired in the disposal of semi-liquid sludges from the manufacture of phosphoric acid. The resulting solids produced by the process are easily broken down to a dirt-like consistency from which toxic arsenic materials can be readily leached out at environmentally unacceptable high levels.

We have now discovered a novel process for permanently disposing of liquid and semi-liquid wastes containing soluble toxic materials which effectively prevents the leaching of the toxic materials into the surrounding environment and thereby effectively eliminates pollution of surrounding streams, underground water systems and the like. The present invention is based upon the discovery that such wastes, particularly aqueous sludge wastes from the manufacture of phosphoric acids and similar industrial and chemical process wastes, can be solidified to a contiguous rock-like solid condition having high strength and low porosity which entraps both insoluble and soluble toxic materials therein thereby preventing leaching when exposed to ambient moisture by admixing with the wastes a critical amount of a hydraulic cement. Most unexpectedly, the amount of hydraulic cement employed has been found to be critical in preventing leaching of toxic materials from solidified wastes; these findings were surprising in view of the teachings of the prior art.

SUMMARY OF THE INVENTION

The present invention is a process for permanently disposing of liquid or semi-liquid wastes containing soluble toxic materials to substantially prevent leaching of these toxic materials into the surrounding environment which comprises admixing the liquid or semi-liquid wastes and a solidifying agent consisting essentially of a hydraulic cement in an amount sufficient to provide a fluid mass which will set upon standing to a contiguous rock-like solid consistency, and then allowing the admixture to set to a contiguous rock-like solid insoluble in water wherein the soluble toxic materials are entrapped and prevented from leaching into the surrounding environment. Unexpectedly, it has been found that the liquid or semi-liquid wastes must be admixed with the hydraulic cement in an amount of at least about 9 lbs. hydraulic cement per gallon of waste containing from about 30 to about 40 volume % solids to provide an admixture which will be sufficiently fluid yet will set to a contiguous rock-like solid consistency of sufficient strength and non-porosity to entrap the soluble toxic materials in the waste to prevent leaching. Preferably, the novel process includes pouring the admixture of semi-liquid waste and binding agent into a subsurface soil pit lined with a moisture impervious film prior to setting to the solidified mass and then covering the solidified mass with a layer of soil.

DETAILED DESCRIPTION OF THE INVENTION

The process of the invention is particularly useful in disposing of aqueous sludge wastes from chemical processes for the manufacture of phosphoric acids, particularly aqueous filter aid sludges. These aqueous filter aid sludges normally contain undesirably high levels of arsenic, e.g. up to 5 mg/l, as dissolved arsenic compounds, such as arsenic pentasulfide along with other contaminants such as hydrogen sulfide and other sulfur compounds dissolved in the liquid component. The aqueous sludges further normally contain about 30 to about 40 volume % solids content which includes a wide variety of mineral compounds, such as diatomaceous earth filter aid, as well as insoluble arsenic, sulfur, iron, phosphoric, etc. compounds.

In accordance with the inventive process, the liquid or semi-liquid waste to be disposed of is intimately admixed with a hydraulic cement in an amount of at least about 9 lbs. hydraulic cement per gallon of waste, based upon the waste containing from about 30 to about 40 volume % solids. This represents about a 30% volume increase to the waste. Unexpectedly, it has been found that at least 9 lbs. hydraulic cement per gallon of waste, basis about 30 to about 40 volume % solids, is required to provide an admixture which will set to a contiguous rock-like solid consistency of sufficient compressive strength and low porosity to entrap the soluble toxic materials in the waste so as to prevent their leaching out when exposed to ambient moisture. The amount of hydraulic cement employed is tremendously higher than the amount of mineral binding agents conventionally employed in conventional processes for solidifying various types of liquid or semi-liquid waste materials. Higher levels of hydraulic cement may be admixed with the liquid or semi-liquid wastes if desirable with relatively little adverse affect on setting, compressive strength, porosity and the like, as long as a fluid admixture is obtained.

As used herein, the term "hydraulic cement" is intended to refer to all mixtures of lime, silica and alumina, or of lime and magnesia; silica, alumina and iron oxide and other like mixtures of ingredients which set under the action of water to a contiguous rock-like solid consistency. Hydraulic cements include hydraulic limes, grappier cement, puzzolan cements, and Portland cements. It is particularly preferred to employ Type I Portland cement. Preferably, the hydraulic cement is admixed with the liquid or semi-liquid wastes alone. However, if desirable, inert granular filler material, or aggregate, such as silt, clay, bentonite, kaolin, shale, limestone, pebbles, etc. or any of the other well-known inert aggregates may be employed as long as the amount added does not reduce the compressive strength of the admixture when allowed to set. In addition, if desirable, other inorganic mineral binding agents as well as conventionally employed binding agent additives, such as sequestering agents, e.g. aluminum chloride, amide salts, etc., and surfactants may be added in minor amounts with the hydraulic cement-liquid waste admixture. However, the employment of such additives, particularly alkali silicates such as sodium silicate, are not preferred inasmuch as they adversely affect the setting of the admixture to a contiguous rock-like solid consistency of high compressive strength and capability of prevent leaching.

The admixture of the hydraulic cement with the liquid or semi-liquid waste may be carried out in accordance with any conventional technique to provide an intimate admixture. We prefer to add the hydraulic cement and wastes in the above-mentioned amounts to a conventional aggregate mixing device whereby the ingredients are intimately admixed to form a fluent mass.

The admixture is then allowed to set to form a contiguous rock-like solid mass having high compressive strength which is insoluble in water and is substantially impervious to water. Normally, the admixture will set in about 12 to about 24 hours upon standing.

Preferably, in accordance with the present invention, the admixture is poured into a subsurface soil pit which has previously been lined with a moisture-impervious film such as polyethylene. The moisture-impervious film should have a thickness sufficient to prevent rupture when the admixture is poured thereon and thus depends upon the weight and thickness of the poured admixture. Preferably, the admixture is poured into the film-lined subsurface soil pit to a level below the surface.

Often after the admixture has been poured, a liquid layer forms on the outer surface thereof. When this occurs, additional hydraulic cement is preferably added such as by sprinkling in an amount sufficient to adsorb this formed moisture layer. Usually, the addition of up to about 1.5 to about 2.0, preferably about 1.6 lbs. per sq.ft. of exposed surface area of additional hydraulic cement is sufficient to adsorb the moisture layer as it is formed. This additional amount of hydraulic cement entraps any soluble toxic materials in the formed moisture layer when it sets.

Finally, in accordance with the method of the invention, after the hydraulic cement-liquid or semi-liquid waste admixture has been allowed to set in the film-lined subsurface soil pit, it is then covered with a layer of suitable soil, such as clay. The layer of soil provides additional protection of the solidified mass from ambient moisture and thus aids in preventing leaching of any toxic materials into the surrounding environment.

According to the invention, substantially any type of liquid or semi-liquid waste containing soluble toxic materials, particularly aqueous filter aid sludges from the manufacture of phosphoric acids containing soluble arsenic, sulfur and related toxic compounds, may be permanently disposed on in an attractive manner whereby pollution of the surrounding environment by leaching of the toxic materials from the wastes when exposed to ambient moisture is substantially effectively eliminated.

The following examples are set forth to illustrate the present invention and are not intended to be limitative thereof.

In the following examples, the liquid or semi-liquid waste employed was an aqueous filter aid sludge obtained from the manufacture of phosphoric acid. The aqueous sludge had been stored in pits and contained, generally, diatomaceous earth, soluble and insoluble arsenic, sulfur, iron, phosphorous, etc. compounds, e.g. arsenic pentasulfide, sulfuric acid, hydrogen sulfide, phosphoric acid, etc. The aqueous sludge had a solids content of about 40% by volume and had a strong hydrogen sulfide odor. The supernate water contained 5 mg/l arsenic.

EXAMPLE I

To a one-half gallon portion of the above-described aqueous sludge was intimately admixed Type I Portland cement in an amount of 9 lbs. cement per gallon of aqueous sludge. The amount of cement added resulted in a volume increase of approximately 30 percent. The admixture was intimately mixed and blended until an intimate fluid mass was obtained. A portion of the admixture was then poured into a 500 ml glass cylinder and allowed to set and solidify to a contiguous rock-like solid. After about 24 hours, the glass cylinder was then broken away and the resulting cylindrical solid was subjected to a static leachate test to determine the amount of arsenic capable of being leached therefrom.

The static leachate test was conducted by submersing the cylindrical solid in 250 ml distilled water for a period of 24 hours. The volume of water was equivalent to 2 inches of rainfall and determined by initially calculating the surface area of the cylindrical solid and then applying the formula of 280 gallons water/1550 ft.$^2$ equalling 1 inch rainfall. The water was then analyzed for arsenic which was determined colorimetrically by the Silver Diethyldithiocarbamate method as described in *Standard Methods For The Examination of Water & Waste Water*, American Public Health Administration, Federal Water Pollution Control Administration, American Water Works Association, 13th Ed., page 62 (1971). The results of the analysis indicated only 0.9 mg/l arsenic was present in the water. A repeat of the static leachate test on the same cylindricl solid submersed in a second 250 ml volume of water showed the second volume of water contained only 0.76 mg/l arsenic.

The results of the experiments of this example illustrate that the soluble toxic materials, e.g. arsenic compounds, present in the treated aqueous sludge are effectively entrapped in the contiguous rock-like solid mass produced in accordance with the inventive process and thereby substantially prevent leaching of such materials from the solidified waste.

EXAMPLE II

In this example, the above-described aqueous sludge was treated to form a solid employing the ingredients and procedure described in U.S. Pat. No. 3,837,872 to Connor. Several portions of the aqueous sludge were admixed with Type I Portland cement and an aqueous solution of sodium silicate, Grade 40, sold by Diamond Shamrock Chemical Corporation, having 38.3 percent solids content and 1:3.22 NaO:SiO weight ratio at various concentrations ranging from 1.669 to 6.676 lbs. cement per gallon of waste and cement to aqueous sodium silicate ratios of 5:1 to 20:6, respectively. All of the samples were intimately admixed and respectively poured into glass cylinders and allowed to solidify. After being allowed to set for about 24 hours, the samples had consistencies ranging from a dirt-like solid to a cylindrical solid which could easily be broken into a dirt-like consistency. Each of the samples were subjected to static leachate tests by submersion in predetermined volumes of water and then analyzing for the presence of arsenic in the water in accordance with the procedures described in Example I. The results of the analyses showed that the presence of arsenic in the leachate waters ranged from a minimum of 36 mg/l to 120 mg/l.

A comparison of the results of Example I to those of Example II demonstrates the surprising improvement in preventing leaching of toxic materials from aqueous wastes treated in accordance with the present invention over a conventional prior art process.

Obviously, many modifications and variations of the invention as hereinbefore set forth may be made without departing from the spirit and scope thereof, and, therefore, only such limitations should be imposed as are indicated in the appended claims.

I claim as my Invention:

1. A process for permanently disposing of liquid or semi-liquid wastes containing soluble toxic materials to prevent said soluble toxic materials from being leached to the surrounding environment comprising the steps of:

admixing a liquid or semi-liquid waste containing soluble toxic materials and a solidifying agent consisting essentially of a hydraulic cement, said liquid or semi-liquid waste and hydraulic cement being admixed in an amount of at least about 9 lbs. hydraulic cement per gallon of said waste based upon the waste containing from about 30 to about 40 volume % solids; and allowing the admixture to set to a contiguous rock-like solid insoluble in water whereby said toxic materials are entrapped and prevented from leaching into the surrounding environment.

2. The process of claim 1, wherein said hydraulic cement is Portland cement.

3. The process of claim 1, wherein said waste is an aqueous sludge derived from the manufacture of phosphoric acid containing soluble and insoluble arsenic compounds and soluble and insoluble sulfur compounds.

4. The porcess of claim 1, wherein said admixture of waste and hydraulic cement is poured into a subsurface soil pit lined with a moisture-impervious film and is then allowed to set to said contiguous rock-like solid.

5. The process of claim 4, wherein said moisture-impervious film is polyethylene film of sufficient thickness to prevent rupture when the admixture is poured into the subsurface soil pit.

6. The process of claim 4, wherein powdered Portland cement is added to the outer surface of said admixture after it has been poured into said pit, the Portland cement being added in an amount sufficient to adsorb any moisture layer forming on the admixture surface during setting.

7. The process of claim 4, wherein a layer of soil is placed over the admixture after it has been allowed to set to the contiguous rock-like solid insoluble in water.

* * * * *